June 17, 1924.
J. B. BARTHOLOMEW
GANG PLOW
Original Filed Jan. 23, 1911    2 Sheets-Sheet 1
1,498,258
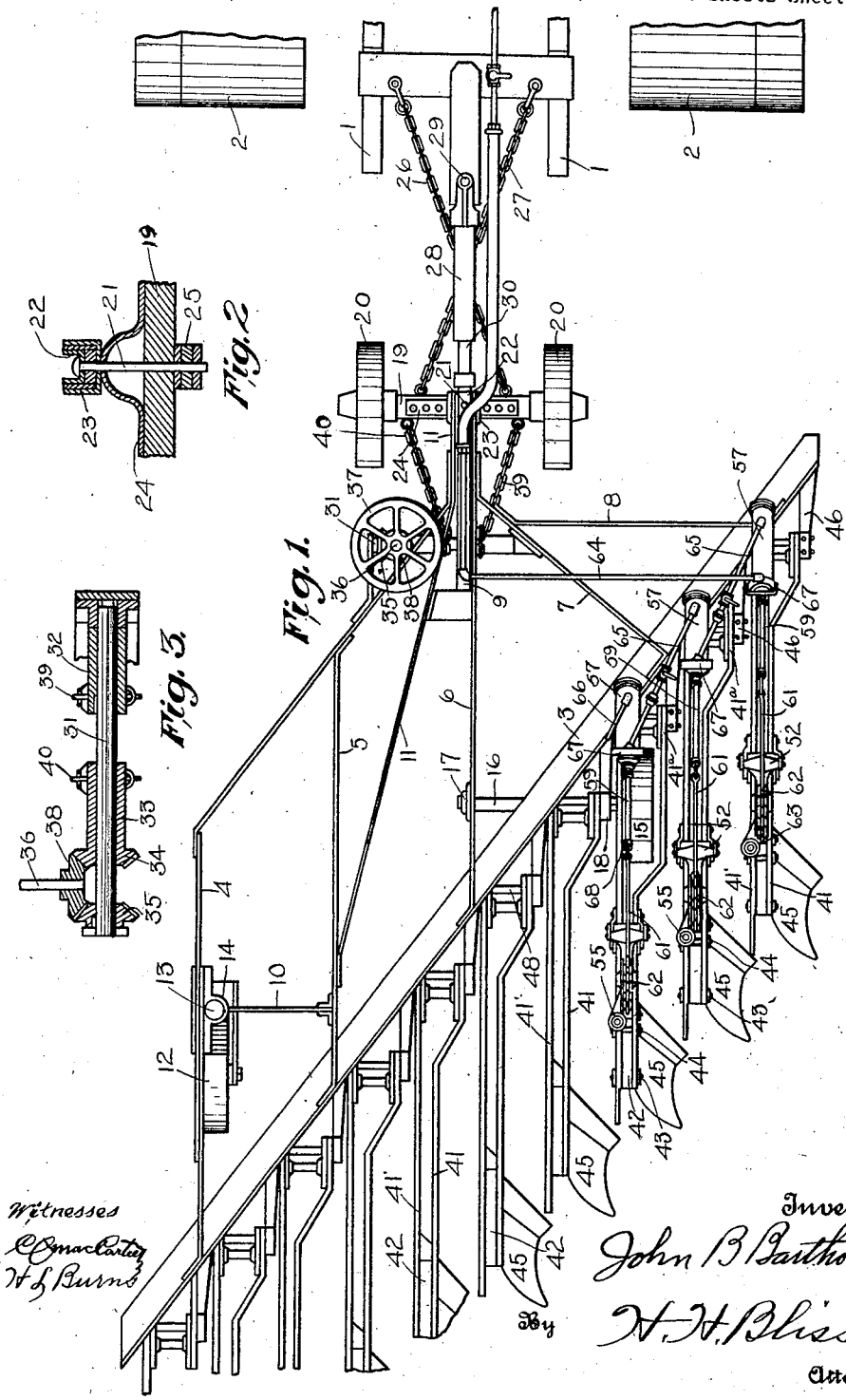
Witnesses
C. C. MacCarter
W. L. Burns
Inventor
John B Bartholomew
By H. H. Bliss
Attorney

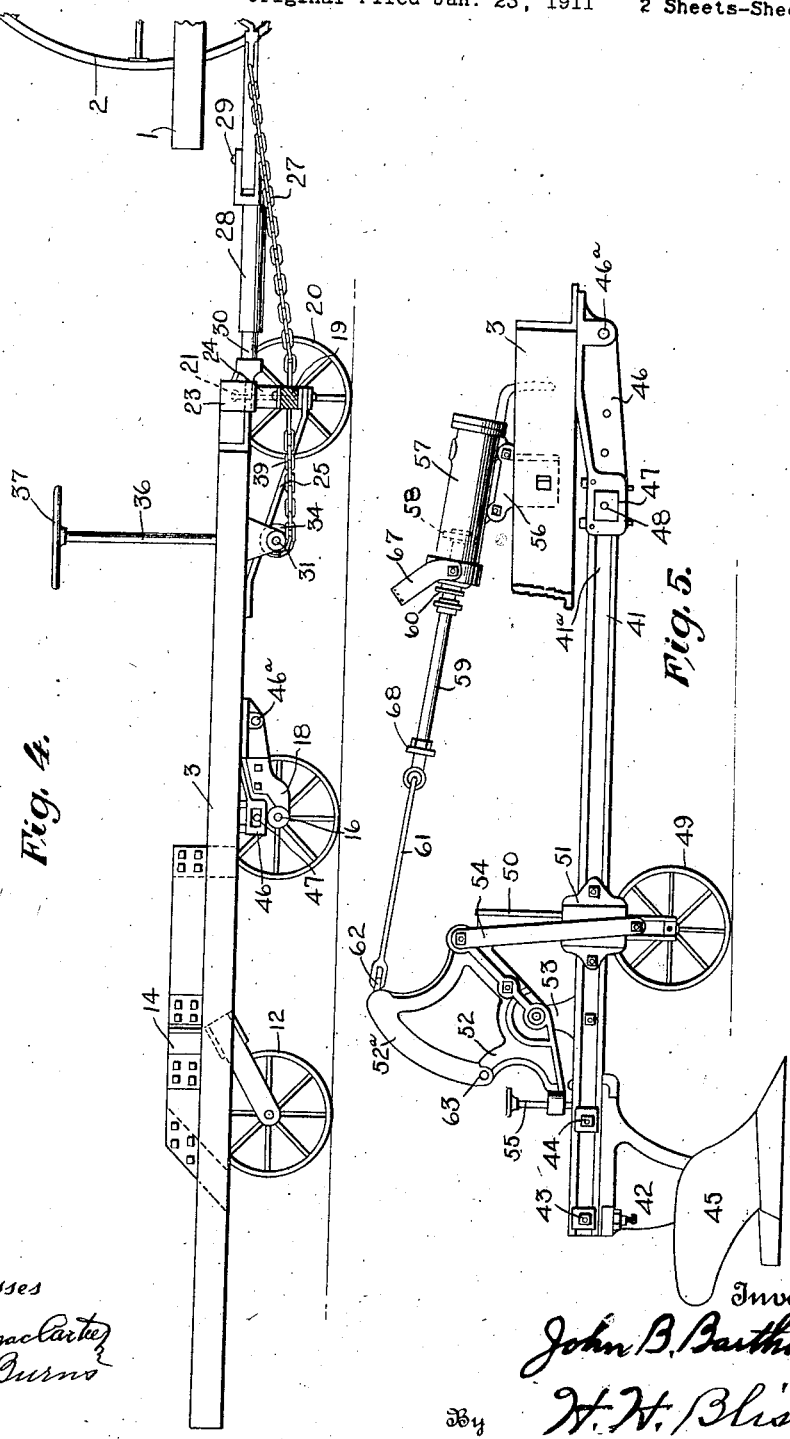

Patented June 17, 1924.

1,498,258

UNITED STATES PATENT OFFICE.

JOHN B. BARTHOLOMEW, OF PEORIA, ILLINOIS, ASSIGNOR TO AVERY COMPANY, OF PEORIA, ILLINOIS, A CORPORATION OF ILLINOIS.

GANG PLOW.

Original application filed January 23, 1911, Serial No. 604,229. Divided and this application filed May 10, 1919. Serial No. 296,240.

*To all whom it may concern:*

Be it known that I, JOHN B. BARTHOLOMEW, a citizen of the United States, residing at Peoria, in the county of Peoria and State of Illinois, have invented certain new and useful Improvements in Gang Plows, of which the following is a specification, reference being had therein to the accompanying drawing.

The invention relates to gang plows of the kind which comprise a main frame adapted to be connected to a suitable tractor and a series of individual plows coupled side by side to the main frame, the present application being a division of my earlier application, Serial No. 604,229, filed January 23, 1911.

The objects of the invention comprise the provision of improved devices for coupling the main plow frame to the tractor, said devices being designed to permit the adjustment of the line of draft laterally relatively to the tractor, and to permit the plow to be backed when desired.

A further object is the provision, in combination with such coupling devices, of means for steering the plow when it is being backed.

A further object is the provision of wheels or other means adapted on the one hand to support the main plow frame from the ground in such manner as to maintain the beam to which the individual plows are attached at as uniform a distance above the ground as possible so as to maintain the depth regulation of the plows so far as possible in passing over uneven ground, and on the other hand, to facilitate the movement of the plow closely in the tracks of the tractor.

All of the various features of invention will be clear from the following description.

In the accompanying drawings,

Fig. 1 is a plan view of a machine embodying my improvements in their preferred form.

Fig. 2 is a detailed transverse sectional view showing the manner of coupling the front ground wheels to the main frame.

Fig. 3 is a vertical section through a portion of the steering gear.

Fig. 4 is a side elevation of the main frame of the plow with one of the front ground wheels omitted to better show some of the features of the construction.

Fig. 5 is a side elevation of one of the plows shown in Fig. 1.

Referring in detail to the construction illustrated, 1 designates the rear part of the frame of a traction engine, and 2, 2 the drive wheels thereof. My improved plow is useful with any form of tractor, but in some respects, as will presently appear, is designed especially for use in connection with a steam tractor.

The main frame consists of an obliquely disposed beam 3, preferably in the form of an angle bar, and a number of bars 4, 5, 6, 7, 8, which are rigidly connected to the beam 3, and which converge or extend toward a central point in front of the beam where they are connected to each other or to a short horizontally disposed beam 9. Additional brace bars 10 and 11 are also preferably provided. All of these bars are made of plain flat stock, and while comparatively light in weight, are so disposed and connected as to form a very strong and rigid frame well designed to sustain stresses to which it is subjected in operation.

The main frame is supported from the ground by several wheels comprising a caster wheel 12, the spindle 13 of which is mounted in a bearing 14 secured to the frame bars 4 and 10 at a point in front of the beam 3. A second ground wheel 15 is disposed to the rear of the beam 3 and at the other side of the frame, being mounted upon a shaft or axle 16 which is supported at one end by a bracket 17 on the bar 6 and at its other end by a bracket 18 which is preferably carried by one of the plow coupling brackets as shown in Figure 4.

The wheels 12 and 15 serve to support the rear parts of the main frame; the front part of the frame is carried by a truck comprising an axle 19 and wheels 20, 20. This truck is connected to the main frame at the front end of the beam 9 by means of a king bolt 21. The preferred form of the construction is indicated in Figure 2. The frame bars 11 and 6 are extended somewhat beyond the front end of the beam 9 and to the extended ends of these bars are secured the U-shaped plates 22 and 23, these plates being perforated to receive the king bolt. The axle 19 has on its upper side an arched plate 24 upon which the stem-like part of the frame rests. The construction is such as to permit a limited rocking movement between the truck axle and the frame. 25 is a brace bar extending from the rear part of the beam 9 downward to the lower end of the king bolt 21.

The frame is connected to the tractor by means of crossed chains 26, 27, the rear ends of which are secured to the axle 19, and the front ends of which are secured to the frame 1 of the tractor. By adjusting the lengths of these crossed chains in relation to each other, the position of the plow frame in relation to the longitudinal axis of the tractor can be varied as desired within certain limits. It is desirable in many cases to adjust the chains so that the center line of the plow frame will take a position to the right of the axis of the center line of the engine, and thus keep the right driving wheel of the engine far enough from the furrow so that it will not break the furrow down and cause slippage of the wheels.

With a chain coupling it is not possible, of course, to back the plow by means of the engine. To make this possible and still retain the advantages of the chain, I provide in addition thereto a backing strut or pole which consists of a front tubular part 28 which is pivoted at 29 to the engine frame, and a rear part 30 which telescopes within the part 28 and is secured at its rear end to the king bolt 21. With this construction, it will be seen that the action of the chains is not interfered with while they are under tension and, at the same time, the parts 28 and 30 when closed together somewhat constitute a strut or pole by means of which the plow frame can readily be backed by backing the engine.

In backing the machine, it is desirable to be able to steer it and for this purpose I provide suitable means for swinging the axle 19. A shaft 31 is rotatably mounted in bearing brackets depending from the main frame. To the right end of this shaft is secured a sleeve 32, and to the left of this sleeve is rotatably mounted a second sleeve 33. A bevel pinion 34 is secured to the sleeve 33 and a bevel pinion 35 is secured to the left end of the shaft 31. 36 is an upright steering post having a suitable hand wheel 37 at its upper end, and at its lower end a bevel pinion or gear 38 which meshes with the pinions 34 and 35. A chain 39 has its rear end secured to the sleeve 32 and its front end to the axle 19, and a similar chain 40 has its rear end secured to the sleeve 33 and its front end to the axle. It will be seen that when the hand wheel 37 is turned, the sleeves 32 and 33 are turned in opposite directions so that one of the chains 39, 40 is wound up as the other is paid out, thus causing the axle 19 to swing in one direction or the other at will.

The plows proper are flexibly connected to the obliquely disposed beam 3. The machine as shown is designed with ten individual plows. Each of the individual plows comprises a beam part formed by two parallel bars 41, 41' which at their rear ends are spaced far enough apart to receive the upper end of the plow shank or standard 42, said standard being clamped in position by bolts 43, 44. A plow body 45 of any suitable form is mounted upon the standard.

The beam bar 41 at its forward end is bent laterally as shown in the plan views so that its front end 41$^a$ is spaced from the front end of the bar 41' further than the rear ends of said bars are spaced from each other. This is done to give the plow beam a laterally extended pivotal connection with the main frame. Such connection is provided by mounting on the beam 3 of the frame a series of rearwardly extending bracket arms 46, which are spaced uniformly from each other as indicated in Figure 1. Each of these bracket arms is formed at its front end with a transverse bearing aperture 46$^a$ and at its rear end is slotted to receive an adjustable bearing block 47. The length of the bracket arms 46 is such that the bearing aperture in the block 47 of one arm is disposed directly opposite the bearing aperture 46$^a$ of the next adjacent arm on the left. In these adjacent bearing apertures is mounted a pivot pin 48 and to this pin are pivotally connected the front ends of the beam-bars 41, 41'.

The standard of each plow is secured adjustably and yieldably to its beam. But as this feature of my improved plow forms the subject matter of another application, Serial No. 670,228, filed on the 9th day of January, 1912, as a division of my aforesaid application, Serial No. 604,229, I have not deemed it necessary to here show and describe the same in detail.

Each of the individual plows is provided with a ground wheel 49 which serves both to gauge the depth of the furrow and also to effect the lifting of the plow. The wheel is mounted upon the lower end of the upright standard 50 which is mounted slidably between the beam bar 41 and a guide 51 secured thereto. 52 is a lever pivotally mounted on a bearing bracket 53 of the plow beam, and 54 is a link connecting the front end of this lever to the lower portion of the wheel standard 50. The rear end of the lever 52 carries a hand screw 55 which is arranged to contact with the upper side of one of the beam bars and thus serves to limit the downward swing of the rear end of the lever 52 and consequently the upward movement of the ground wheel 49. By adjusting the screw 55, the plow can be gauged to cut at different depths.

To effect the lifting of the plows, the following devices are provided: In front of each plow is a bracket 56 mounted on the frame beam 3 and to this bracket is bolted a steam cylinder 57. In the cylinder is a piston 58 which is secured to a piston rod 59 that extends through a suitable stuffing box 60 in the front head of the cylinder. The rear end of the piston rod is connected by means of a link 61 to a chain 62 which in turn is secured at 63 to the lever 52. This lever is formed with a segment arm 52ª which is grooved to receive the chain 62. It is clear that if the piston 58 is moved forward in the cylinder 57, said movement will be transmitted by the piston rod 59, the link 61 and the chain 62 to the lever 52 causing the front end of said lever to be swung downward and forward relative to the plow beam upon which it is mounted. As said lever is connected by means of the link 54 to the wheel standard 50, it follows that such swinging of the lever will cause a lifting of the plow beam on the standard 50. As the cylinder 57 is rigidly mounted on the engine frame, it is desirable that the line of draft between the piston and the chain 62 should remain fixed so that the piston rod will not be subjected to binding stresses. To this end the guide 52ª is so shaped, account being taken of the bodily movement of the lever 52 as well as of its swinging movement, that the point of departure of the chain 62 from said segment remains in the fixed line of draft coincident with the axis of the piston rod 59.

The cylinder 57 of the right-hand plow of the series is supplied with steam through a pipe 64 and this cylinder is connected at a point near its front end with the rear end of the next adjacent cylinder by means of a pipe 65. In a similar way the second cylinder is connected with the third. The right-hand cylinder 57 is also provided at its front end with an exhaust pipe 66. The arrangement of the various pipes and parts is such that when steam is turned on through the supply pipe 64—it being understood that steam can be drawn from the boiler of a traction engine—the piston in the right-hand cylinder is first moved forward to lift the right-hand plow and as this piston nears the end of its travel the piston in the next adjacent cylinder is similarly operated and so on through the series, the several plows being lifted in succession so that all are drawn from the ground practically on the same transverse line. In a similar manner when the steam pressure is cut off and the supply pipe opened to exhaust the plows will be lowered one after the other, beginning with the right-hand plow, so that they all take into the ground on the same transverse line. I do not deem it necessary to here describe the various steam ports and connections by means of which this operation is secured, as these features of my invention are covered in my original application above referred to, of which the present is a division.

When the plows are raised from the ground it will be understood that they are supported upon their ground wheels 49. The plows can be held in this elevated position by steam pressure but if they are to be held for any considerable length of time they can be locked up by means of bails 67, one of which is pivotally mounted upon the rear end of each cylinder 57 in position to be swung downward to engage a flange or collar 68 on the piston rod 59 when the piston is moved to the front end of its cylinder.

The operation of my improved plow and the manner in which it is handled will be readily understood from the foregoing description. In hauling the plow to the field the several individual plows are locked in their elevated positions in the manner described. On entering the field at the point of beginning the operator lowers the plows preferably by first admitting steam to the steam cylinders to relieve the tension on the locking bails 67 so that they can be lifted to inoperative position. Then on opening the steam cylinders to exhaust the plows are lowered in the manner previously described. On arriving at the turning point the plows are lifted by admitting steam and after having been turned are again lowered by opening the exhaust.

If at any time it is desirable to back the plow, this can readily be done by simply backing the engine, the plow operator in the mean time being at the steering wheel 37 to control the front ground wheels 20. By swinging these wheels, the plow frame can readily be steered in the backing operation. Of the gang plows constructed or proposed heretofore, the only ones known to me which were capable of being backed by the tractor, were those in which the main frame was provided with devices for bodily lifting the individual plows off the ground. By pivoting the individual plows directly to a rigid frame structure, by supporting each individual plow upon a ground wheel and by providing a strut or pole between the engine and plow, I have produced a machine having the advantages of simplicity, lightness and cheapness, which at the same time is capable of being backed by the tractor and handled in practically the same manner as the prior constructions referred to which were heavier, more cumbersome and more expensive to build.

It will be understood further that the telescoping form of backing pole which I employ does not interfere in any way with the action of the draft chains, and the latter can have their lengths adjusted in relation to each other to shift the center line of the plow frame laterally relative to the center line of the tractor.

What I claim is:

1. The combination with a tractor, and a wheel-supported trailing structure adapted to be drawn by the tractor, of a draft device permanently connected to the tractor and to the trailing structure, and a back-pressure device arranged to bear, at option, backward against the trailing structure and to be automatically thrown out of action when the draft device is operating, said draft device and back-pressure device both being adapted to permit lateral movement bodily of either the tractor or the trailing structure relatively to the other.

2. The combination with a tractor and a wheel-supported trailing structure adapted to be drawn by the tractor, of two sets of power transmitting devices, the devices of both sets being permanently connected to both the tractor and the trailing structure and adapted to permit lateral movement bodily of either of said structures relatively to the other, the devices of the first set being arranged to transmit draft tension to the trailing structure for advancing it, and the devices of the second set being arranged to transmit back-pressure to the trailing structure and to be automatically rendered inactive when the devices of the first set are in action.

3. The combination with a tractor, and a trailing wheel supported frame of two draft devices, one adapted to transmit draft to said frame when the tractor is advancing on a path angulated in one direction, and the other adapted to transmit draft to said frame when the tractor is advancing on a path angulated in the opposite direction, and a back pressure device adapted to transmit pressure to said frame and to be automatically rendered inactive when either of said draft devices is in operation.

4. The combination with a tractor, and a trailing wheel supported frame, of a back pressure device permanently connected to the tractor and to said frame, and adapted, at option, to transmit back pressure from the tractor and a draft device permanently connected to the tractor and to said frame for transmitting draft and adapted to become automatically inoperative when the back pressure device is in action.

5. The combination with a tractor, and a trailing wheel supported frame, of two sets of power transmitting devices both permanently connected to said frame and to the tractor, those of one set being adapted to transmit draft tension to said frame, and those of the other being adapted to transmit back pressure thereto, and the devices of each set being arranged to be entirely inactive when those of the other are in operation.

6. The combination with a tractor, and a wheeled structure adapted to be drawn by the tractor, of a set of draft devices interposed between the engine and the drawn structure, a second set of devices interposed between the engine and the drawn structure for transmitting back-pressure from the tractor to the drawn structure, and manually operable means adapted to cause the drawn structure to move bodily laterally relatively to the tractor when either the said draft devices or the said backing devices are active.

7. The combination of a tractor, a trailing structure adapted to be drawn by the tractor, two crossed draft chains each independently connected to both the tractor and the trailer and arranged to exert draft on the trailing structure when it is at a predetermined distance bodily from the tractor and to be inactive when the trailing structure is at a less distance, and back-pressure devices flexibly connected to the tractor and to the trailing structure and arranged to be active when the tractor moves relatively backward bodily to points at said shorter distance from the trailing structure.

8. The combination of a tractor, a trailing structure adapted to be drawn by the tractor, the manual steering devices adapted to cause the trailing structure to move in either direction laterally, the draft devices connected directly to said steering devices and also connected to the tractor, and back-pressure devices adapted to permit the tractor to move bodily longitudinally away from the trailing structure and also to move bodily laterally relatively thereto.

9. The combination of a tractor, a trailing structure adapted to be drawn by the tractor, the manual steering devices for the trailing structure adapted to cause it to travel laterally in either direction relatively to the tractor, draft devices connecting the tractor to the trailing structure, back-pressure device connected at its ends to the tractor and to the trailing structure respectively and adapted to swing laterally at either end and also to permit the tractor to move bodily away from the trailer.

In testimony whereof, I affix my signature, in presence of two witnesses.

JOHN B. BARTHOLOMEW.

Witnesses:
A. C. EYSTER,
R. M. ODELL.